ated Sept. 7, 1971

United States Patent

[11] 3,603,793

| [72] | Inventor | Holland D. Warren |
| | | Lynchburg, Va. |
| [21] | Appl. No. | 846,791 |
| [22] | Filed | Aug. 1, 1969 |
| [45] | Patented | Sept. 7, 1971 |
| [73] | Assignee | The Babcock & Wilcox Company |
| | | New York, N.Y. |

[54] RADIATION DETECTOR SOLID STATE RADIATION DETECTION USING AN INSULATOR BETWEEN THE EMITTER AND COLLECTOR
6 Claims, 2 Drawing Figs.

[52] U.S. Cl. .................................................. 250/83.1,
 250/83.3, 313/61
[51] Int. Cl. ...................................................... G01t 3/00
[50] Field of Search ........................................... 250/83.1,
 83.3; 313/61

[56] References Cited
UNITED STATES PATENTS

| 3,375,370 | 3/1968 | Hilborn .......................... | 250/83.1 |
| 3,390,270 | 6/1968 | Treinen et al. .................. | 250/83.1 |
| 3,400,289 | 9/1968 | Anderson ....................... | 250/83.1 X |

Primary Examiner—James W. Lawrence
Assistant Examiner—Davis L. Willis
Attorney—J. Maguire ABSTRACT: An improved radiation detector which affords a prompt response to changes in the neutron and gamma flux incident upon a ytterbium emitter by using a thickness of insulator between the emitter and collector that is sufficient to absorb delayed electrons emitted at a lower energy level from the emitter and yet allow prompt electrons emitted at a higher energy level from the emitter to reach the collector. By thus eliminating the delayed electrons, the signal output current of the detector represents the instantaneous value of the incident neutron and/or gamma flux.

PATENTED SEP 7 1971 3,603,793

INVENTOR.
Holland D. Warren
BY
*J Maguire*
ATTORNEY

RADIATION DETECTOR SOLID STATE RADIATION DETECTION USING AN INSULATOR BETWEEN THE EMITTER AND COLLECTOR

BACKGROUND AND SUMMARY OF THE INVENTION

This invention relates in general to the instrumentation of nuclear reactors and more particularly to an improved solid-state radiation detector that is suitable for extended incore use as a local power level monitor.

The radiation detector or the instant invention is capable of monitoring the neutron flux and/or the combined neutron and gamma ray flux intensities existing at a given localized region within the core of the reactor and establishing a signal output current representing the instantaneous value of the radiation sensed. Through the application of the appropriate calibration data, it is possible to determine as desired, either the local neutron flux, the local gamma ray flux, or the local power level.

There is an economic advantage in obtaining as much power as possible from a given amount of nuclear reactor fuel. An increase to optimum power density in a reactor core can be achieved only if the safety system can provide instantaneous protection by responding promptly to power changes in each fuel channel. Hence, it is important that such incore detectors as are used in a sensing of core power density be capable of prompt response to changes in power density as manifested by changes in local neutron and gamma fluxes. The output signals from such detectors must then necessarily represent incore flux conditions that are instantaneously current rather than flux conditions that actually existed several seconds or more in the past.

Solid-state neutron detectors are generally known, as exemplified by U.S. Pat. No. 3,375,370 to Hilborn, and U.S. Pat. No. 3,400,289 to Anderson.

A typical solid-state neutron detector has an emitter which emits electrons when bombarded by neutrons, a collector, and an insulator interposed between the emitter and collector. The number of electrons emitted per unit time corresponds to the intensity of the neutron flux, and for a given insulator configuration, the number of electrons reaching the collector to constitute the signal output current corresponds to the intensity of the neutron flux interacting with the emitter. Many emitter materials also emit electrons when bombarded by gamma rays and hence in such solid-state detectors some of the electron emission will be due to incident gamma rays, some will be due to internal gamma omission resulting from the capture of incident neutrons, and some electron emission will be due to beta decay processes occurring as a result of neutron bombardment. The electrons resulting from externally incident gamma rays and the secondary gamma rays produced upon neutron capture are emitted promptly from the emitter whereas the electrons resulting from beta decay are emitted after a fixed delay period after neutron capture, the amount of delay being characteristic of the emitter material.

It can thus be appreciated that if the signal output current of the detector could be made up substantially entirely by the prompt electrons and the delayed electrons could in some way be prevented from reaching the collector and thus eliminated from the signal current, such signal current would then represent the instantaneous value of the neutron and/or gamma ray flux intensities acting upon the emitter, and would be free from any confusion resulting from the mixing of past flux condition data with the current data.

The invention provides a radiation detector which can be used for incore monitoring of localized neutron flux, gamma radiation or both. This detector has, as do certain prior art detectors, an emitter, a collector, and an insulator interposed between the emitter and collector. The improvement afforded by the invention lies in the combination of a special emitter material and selected thickness of insulation. The emitter is made of a material which when bombarded concurrently by neutrons and gamma rays emits prompt electrons in a quantity indicative of the combined neutron and gamma ray flux intensities, and emits delayed electrons in a quantity indicative of the neutron flux intensity. According to preferred embodiments of the invention, the emitter material can be either ytterbium or hafnium. The choice of such materials is predicated upon the fact that the delayed electrons from neutron capture beta decay are emitted at a primary energy level less than that of the prompt electrons which are emitted as the result of incident gamma radiation and secondary gamma emission upon neutron capture.

Since the prompt electrons on the average have a higher energy than the delayed electrons, in the case of such materials, it is therefore possible to mask such component of the collector output current as would otherwise be produced by the delayed electrons. This is done by choosing an insulator having a thickness sufficient to absorb the lower energy delayed electrons and yet allow the higher energy prompt electrons to reach the collector. The collector output current signal will then be constituted substantially entirely by the prompt electrons and will follow instantaneously (for practical purposes) variations in neutron flux and/or gamma intensity. By absorbing the delayed electrons in the insulator, from which they are eventually returned to the emitter, the detector signal current has no component that represents past flux conditions, and hence such signal will not present any confusion between present and past flux information.

In the preferred embodiments of the invention, the collector is disposed in coaxially surrounding relation to the emitter, and the insulator in a layer of magnesium oxide or aluminum oxide coaxially surrounding the emitter and itself coaxially surrounded by the collector. For a ytterbium or hafnium emitter, the radial thickness of magnesium oxide insulation is within the range 0.020 inch to 0.025 inch.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DESCRIPTION OF THE PREFERRED EMBODIMENTS OF THE INVENTION

Figure 1:
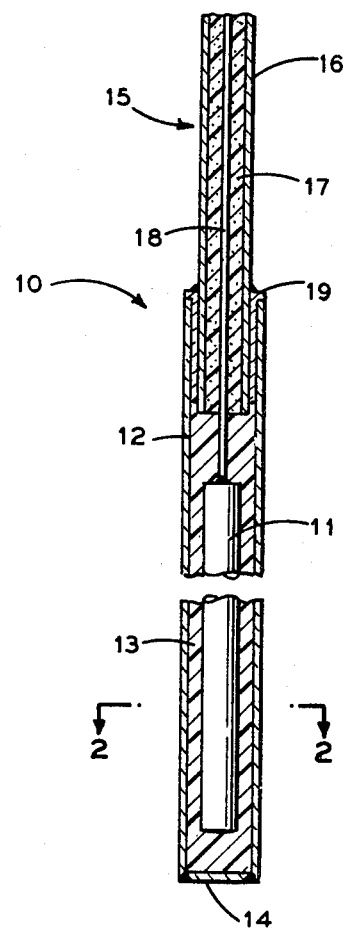
FIG. 1 is a longitudinal view, partly in section, of a radiation detector according to a preferred embodiment of the invention.
Figure 2:
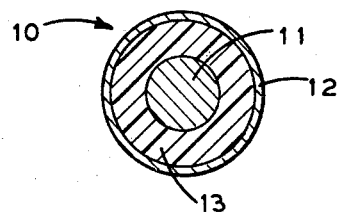
FIG. 2 is a transverse cross-sectional view of the radiation detector shown in FIG. 1 as taken along line 2—2 therein.

The radiation detector 10 exemplified by FIGS. 1 and 2 has an emitter 11 made of a cylindrical rod of ytterbium.

Coaxially surrounding emitter 11, and itself coaxially surrounded by a cylindrical collector sheath 12 is an insulator layer 13 of magnesium oxide.

Collector 12 is expediently made of Inconel tubing and is closed at one end by a metal plug 14 attached as by welding.

At the other end of collector 12 there is connected a coaxial cable 15 which comprises an outer sheath 16 of Inconel surrounding an insulator filler 17 of magnesium oxide through which extends an Inconel lead wire 18 that is electrically connected to the end of emitter 11 as by welding or soldering. Cable sheath 16 is received by a metal bushing 19 inserted into collector 12 and secured thereto by welding such that bushing 19, cable sheath 16 and collector 12 are electrically connected together.

When the detector 10 is installed within the core of an operating reactor, (not shown) incoming neutrons and gamma rays easily pass through the cable 15, collector 12 and insulator 13 with little effect and are absorbed by the emitter 11.

The net effect of such neutron and gamma ray capture in the emitter 11 material is emission of electrons from the exterior surface thereof. With a ytterbium or hafnium emitter 11, the bombardment thereof by neutrons causes the emission of both prompt electrons, and delayed electrons.

An important characteristic of these two selected elements, ytterbium and hafnium, is that the delayed electrons which they emit by beta decay are emitted at a primary energy level less than that of the electrons which they emit promptly. For $Yb_{175}$ and $HF_{181}$, the primary energy levels of the beta decay electrons are 470 Kev. and 410 Kev. respectively, whereas for the same elements, prompt electrons are emitted over the energy range 0 to 7.5 Mev., with the primary energy level being well over 500 Kev. The number of electrons in each of these classes emitted per unit time corresponds to the intensity of the neutron flux. However, in the case of the delayed electrons the number of electrons emitted from the surface of emitter 11 at any given instant corresponds to the neutron flux intensity existing at a fixed delay time previously, this delay time corresponding to the half-life of the beta decay product, which for $Yb_{175}$ is 4.2 days, and for $Hf_{181}$ is 43 days.

To have an output signal current that represents the instantaneous value of neutron flux interacting with emitter 11, the delayed electrons must be prevented from reaching the collector 12. This is done in accordance with the invention by using a magnesium oxide insulator 13 having a radial thickness within the range 0.020 inch to 0.025 inch which is sufficient to absorb substantially all of the delayed electrons below 500 Kev., but yet allow the higher energy prompt electrons to reach collector 12 to constitute substantially the entire output signal current delivered to external monitoring instrumentation (not shown) via cable 15.

As a guide in the practice of the invention a detector 10 can be constructed using a ytterbium wire 0.048- to 0.050-inch diameter by 9.0 inches long for the emitter 11, Inconel tube 0.125-inch OD and 0.010-inch wall thickness for the collector 12, and a layer of magnesium oxide for the insulator 13.

For such detector 10, the coaxial cable 15 is expediently made from Inconel tubing 0.062-inch OD with 0.010-inch wall thickness for sheath 16, and Inconel wire 0.009-inch diameter for the lead wire 18.

Under typical operating conditions the detector 10 will be exposed to gamma rays as well as thermal neutrons. The emitter 11 is also sensitive to bombardment by gamma rays and will emit prompt electrons in a quantity indicative of the gamma ray flux intensity. The ratio between the neutron and gamma sensitivities of detector 10 can readily be detected by simple calibration procedures well known to those skilled in the art, so that the data signal obtained from detector 10 can be corrected so as to represent either the neutron flux intensity, the gamma flux intensity, or both.

The prompt responding detector 10 of the invention is capable of extended incore service in a power reactor because ytterbium and hafnium emitters are far less subject to burnup than other emitter materials used in prior art detectors. While prompt neutron and gamma response can be obtained in prior art detectors not utilizing electron energy discriminating insulators between emitter and collector, such prompt response is achieved at the sacrifice of emitter life, whereas with the invention, emitter life is not seriously compromised in order to attain prompt response.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. In a radiation detector having an emitter, a collector and an insulator interposed between such emitter and collector, the improvement which comprises an emitter made of a material which when bombarded by neutrons emits prompt electrons and delayed electrons in respective quantities each indicative of the intensity of the neutron flux, said delayed electrons being emitted at a primary energy level less than that of the prompt electrons, and an insulator having a thickness sufficient to absorb said lower energy delayed electrons and yet allow the higher energy prompt electrons to reach the collector to establish a signal output collector current constituted substantially entirely by said prompt electrons and representing the instantaneous value of neutron flux interacting with the emitter.

2. The improvement according to claim 1 wherein said emitter is made of ytterbium.

3. The improvement according to claim 1 wherein said emitter is made of hafnium.

4. The improvement according to claim 2 wherein said collector is disposed in coaxially surrounding relation to said emitter.

5. The improvement according to claim 4 wherein said insulator is a layer of magnesium oxide coaxially surrounding said emitter and coaxially surrounded by said collector, and having a radial thickness within the range 0.020 inch to 0.025 inch.

6. In a radiation detector having an emitter, a collector and an insulator interposed between such emitter and collector, the improvement which comprises an emitter made of a material which when bombarded concurrently by neutrons and gamma rays emits prompt electrons in a quantity indicative of the combined neutron and gamma ray flux intensities, and emits delayed electrons in a quantity indicative of the neutron flux intensity, said delayed electrons being emitted at a primary energy level less than that of the prompt electrons, and an insulator having a thickness sufficient to absorb said lower energy delayed electrons and yet allow the higher energy prompt electrons to reach the collector to establish a signal output collector current constituted substantially entirely by said prompt electrons and representing the instantaneous value of the combined neutron and gamma radiation flux interacting with the emitter.